United States Patent [19]

Fischer et al.

[11] 4,096,221
[45] Jun. 20, 1978

[54] STRIATED SOAP BAR FORMING

[75] Inventors: Charles F. Fischer, Jersey City; Hargovind H. Joshi, Piscataway, both of N.J.

[73] Assignee: Colgate-Palmolive Company, New York, N.Y.

[21] Appl. No.: 711,452

[22] Filed: Aug. 4, 1976

Related U.S. Application Data

[63] Continuation of Ser. No. 521,070, Nov. 5, 1974, abandoned.

[51] Int. Cl.² .............................................. B29F 3/12
[52] U.S. Cl. ..................................... 264/75; 252/367; 264/146; 264/148; 264/211; 264/245; 264/320; 425/131.1
[58] Field of Search ................. 264/75, 146, 148, 211, 264/320, 245; 252/367–371; 425/131.1

[56] References Cited

U.S. PATENT DOCUMENTS

| | | | |
|---|---|---|---|
| 2,296,842 | 9/1942 | Garvey et al. | 264/148 |
| 2,414,097 | 1/1947 | Garvey et al. | 264/176 R |
| 2,495,005 | 1/1950 | Hoglin | 264/245 |
| 2,649,417 | 8/1953 | Compa | 252/368 |
| 3,159,699 | 12/1964 | Sutphin | 264/320 |
| 3,485,905 | 12/1969 | Compa et al. | 264/75 |
| 3,832,431 | 8/1974 | Matthaei | 264/75 |
| 3,891,365 | 6/1975 | Fischer | 425/131.1 |
| 3,947,200 | 3/1976 | Fischer | 425/131.1 |

Primary Examiner—Jeffery R. Thurlow
Attorney, Agent, or Firm—Strauch, Nolan, Neale, Nies & Kurz

[57] ABSTRACT

Soap worked in a plodder with introduction of a color dye for color striation of the extruded column is extruded through a die plate that has a rectangular opening corresponding to the major face dimensions (length and width) of the product bar so that the extrusion grain is perpendicular to the major faces, and the extruded column is severed at distances equal to the product bar thickness to provide blanks that are pressed in a direction parallel to the extrusion grain to form the product bar. Special locations for color introduction are provided and a unique "carrara" marble effect is produced in the bar.

6 Claims, 22 Drawing Figures

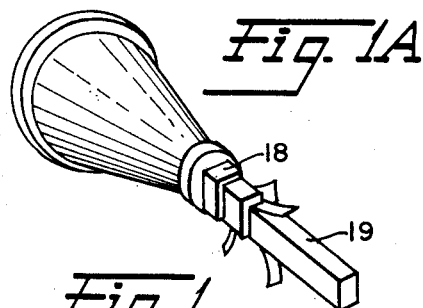
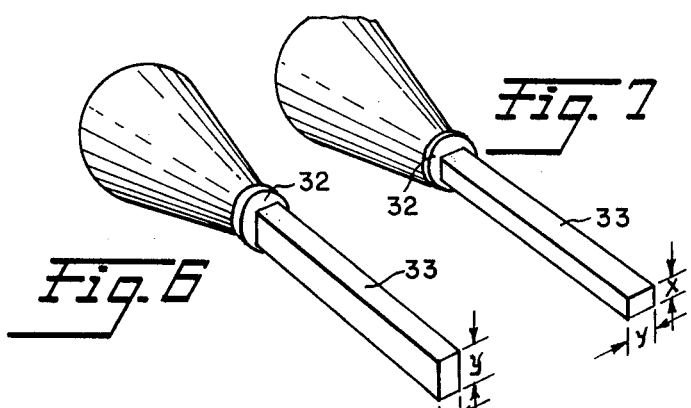
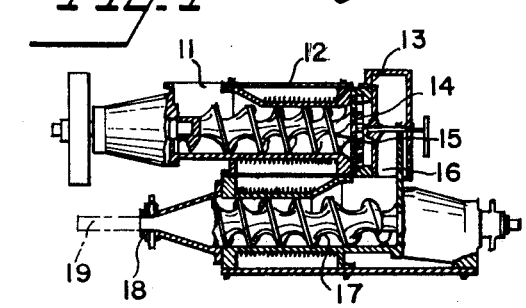
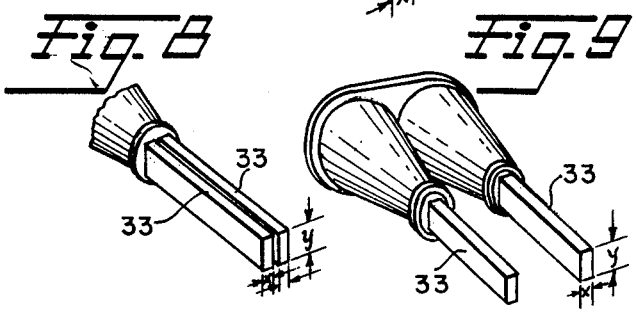
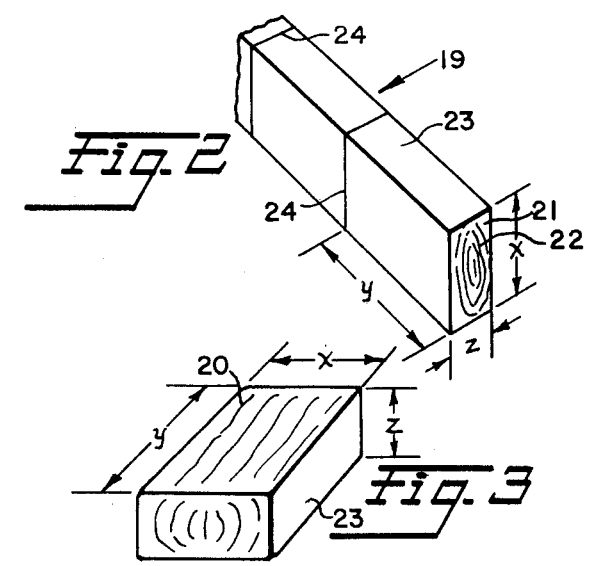
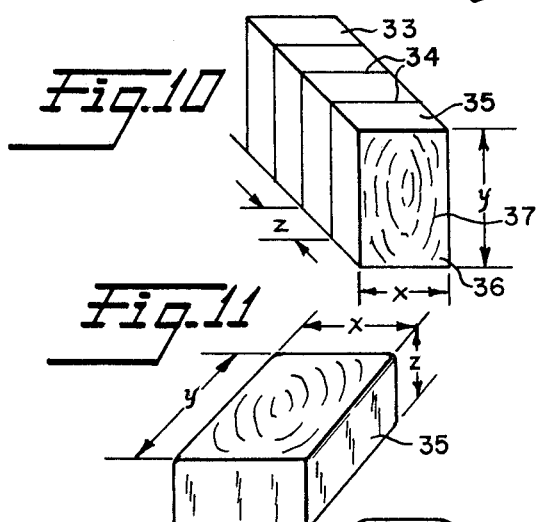
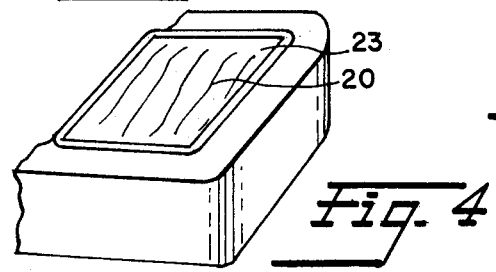
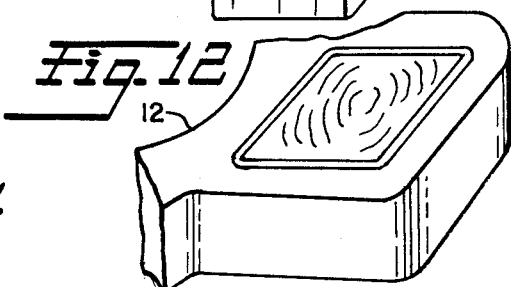
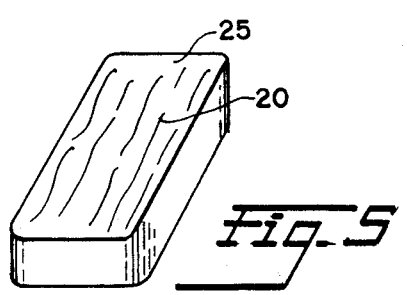
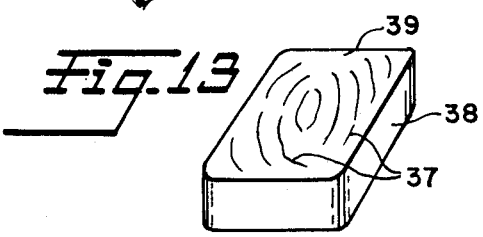

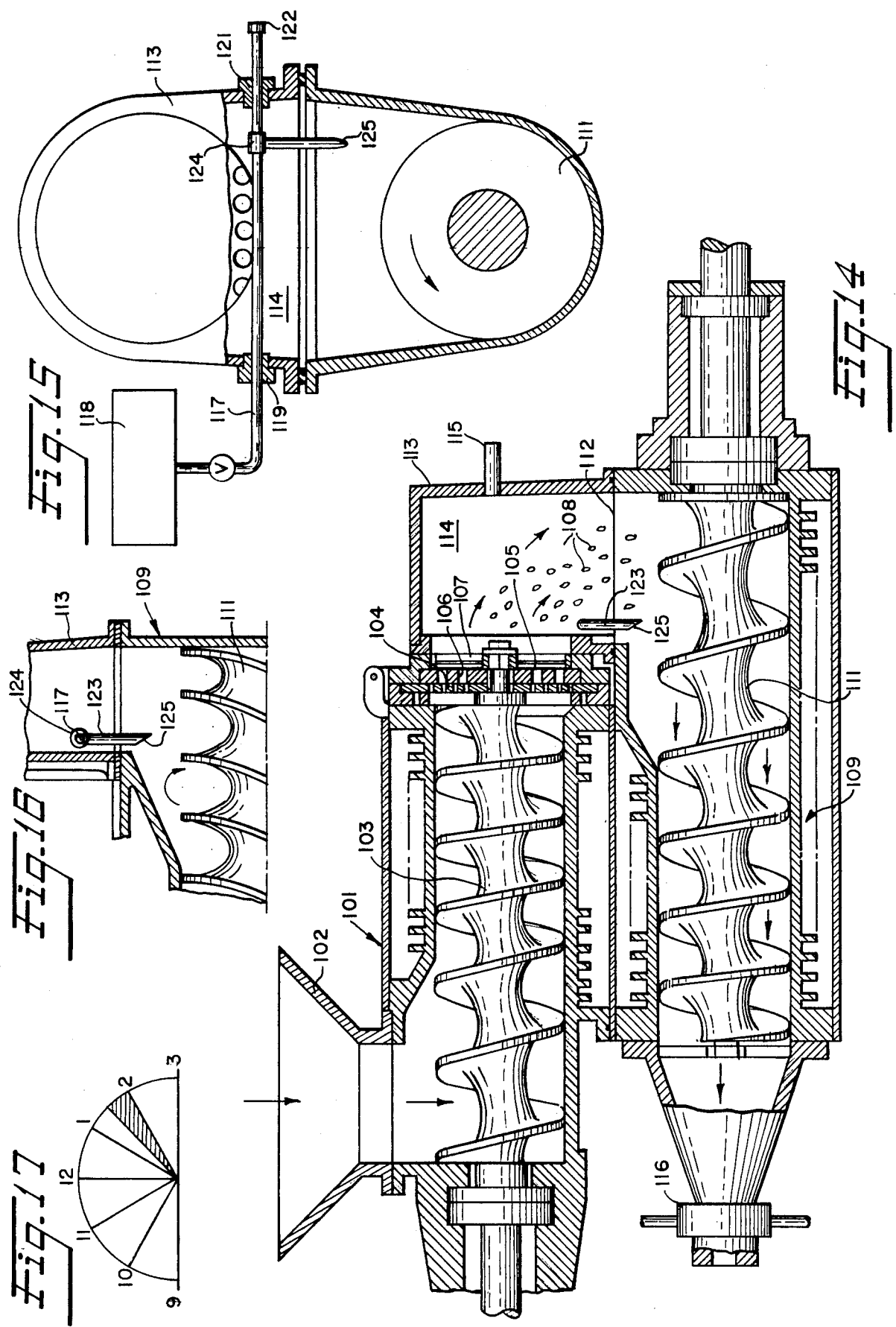

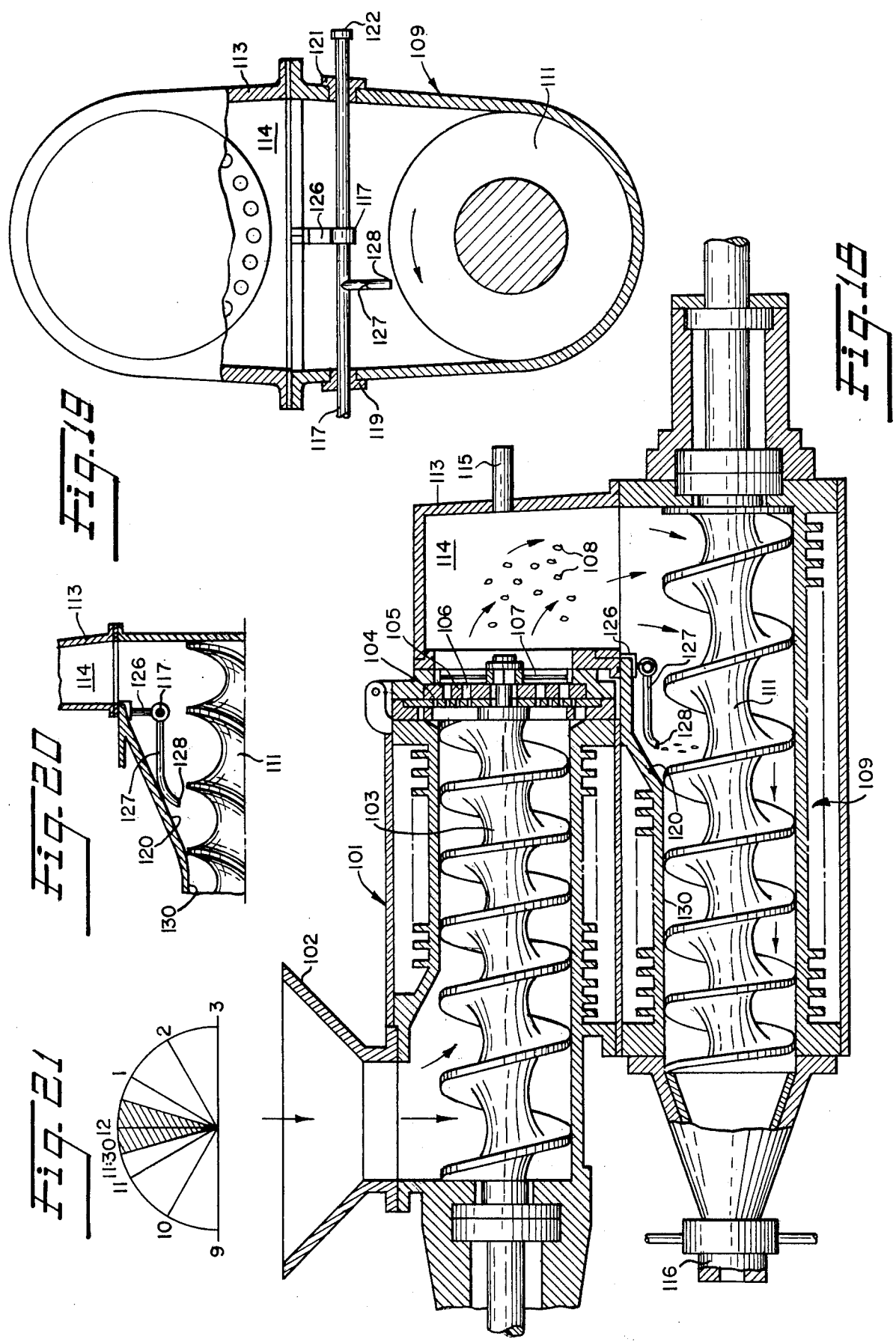

STRIATED SOAP BAR FORMING

This is a continuation of application Ser. No. 521,070, filed Nov. 5, 1974, now abandoned.

This invention relates to a mode of producing color striated or marbleized soap bars and particularly to a method of orienting, subdividing and pressing soap extruded from a more or less conventional type plodder.

The term soap includes soaps, detergents and mixtures of the same.

HISTORY OF INVENTION

It is known as disclosed in Compa et al. U.S. Pat. No. 3,485,905 to produce color striated soap bars, that is soap bars having a base color striated or streaked with another color, the term color including white as well as lighter and darker shades of the base color, by a method wherein soap being plodded in a more or less conventional plodder assembly has a liquid coloring agent added thereto during a stage of the plodding operation.

The striated soap produced by the Compa et al method has been quite successful and is currently widely sold under the trademark "IRISH SPRING". The striations in this product appear as streaks or lines longitudinally of the product and, while this is attractive, the invention provides an improvement which advantageously produces a marbleized soap of even greater attractive appearance, this being effected by control of color introduction, different and novel modes of orientation during extrusion, separation into blanks and final pressing, all as will appear as the description proceeds.

BRIEF DESCRIPTION OF DRAWINGS

FIG. 1 is a side elevation mainly in section illustrating conventional double barrel plodder of the type adapted for producing striated soap;

FIG. 1A is generally perspective view showing the extrusion end of the lower plodder barrel in FIG. 1;

FIG. 2 is a generally perspective fragmentary view showing end striation of the extruded soap bar as it emerges from the plodder of FIG. 1 and the manner it is conventionally cut into blanks.

FIG. 3 is a generally perspective view of a blank of FIG. 2 in position for introduction into an upwardly open die part;

FIG. 4 is a generally perspective view showing the blank in the die for compression;

FIG. 5 is a generally perspective view showing the complete striated soap bar ready for packaging;

FIG. 6 is a fragmentary generally perspective view showing the lower plodder barrel modified to extrude the soap column or billet according to a preferred embodiment of the invention;

FIG. 7 is a fragmentary generally perspective view similar to FIG. 6 but showing extrusion of the soap column with the major or length axis horizontal;

FIG. 8 is a fragmentary generally perspective view similar to FIG. 6 but showing side by side columns as extruded through a modified plodder nozzle;

FIG. 9 is a fragmentary generally perspective view similar to FIG. 6 showing two columns simultaneously extruded in a twin worm plodder;

FIG. 10 is a fragmentary generally perspective view showing end striation and mode of severing blanks for any of FIGS. 6-9;

FIG. 11 is a generally perspective view showing a blank of FIG. 10 oriented for vertical pressing;

FIG. 12 is a generally perspective view showing the blank of FIG. 11 in a die part;

FIG. 13 is a generally perspective view showing the complete pressed marbleized bar ready for packaging;

FIG. 14 is a side elevation, partly in section illustrating a double barrel plodder wherein coloring is added to the soap being worked according to one mode of practicing the invention;

FIG. 15 is an end view partly in section within the vacuum chamber of FIG. 14 showing one location of the color injection means;

FIG. 16 is an enlarged fragmentary view in section showing further detail;

FIG. 17 is a diagrammatic view illustrating the positional range of the injection means of FIGS. 14 and 15;

FIG. 18 is a side elevation mainly in section showing a double barrel plodder wherein coloring is added to the soap being worked accordng to an optimum mode of practicing the invention;

FIG. 19 is an end view mainly in section through the vacuum chamber of FIG. 18 showing a preferred location for color injection;

FIG. 20 is an enlarged fragmentary view in section showing further detail; and

FIG. 21 is a diagrammatic view illustrating the positional range of the injection means of FIGS. 19 and 20.

PRIOR ART

FIGS. 1-5 for purposes of comparison and explanation of the invention illustrate a prior art mode of producing striated soap.

FIG. 1 shows a double barreled plodder of the type disclosed in said Compa et al patent, wherein milled soap introduced through opening 11 in the upper barrel is compacted and worked by a worm 12 which forces it through a compression plate 13 having apertures 14, and the filaments passing through the plate are cut by a knife 15 rotating with the worm into pellets of desired size which drop through a vacuum chamber 16 and an opening in the lower barrel onto a worm 17 that forces the soap through a shaping nozzle plate at 18 from which it emerges as a rectangular column 19. Dye is injected into the soap being worked as in said Compa et al Patent, so that the column is color striated.

As shown in FIG. 1A the nozzle forming plate is provided with conventional knife blades that shave slim ribbons from each peripheral surface of the extruding column, the purpose of this being mainly to uncover and clarify the striation design. Thus the opposite vertical sides of the extruded column exhibit linear streaks or striations 20, as for example on major larger area face of the blank in FIG. 3. The ribbons are collected and recycled into the plodder.

The nozzle plate at 18 has a dimension X which is the extrusion width and a dimension Z that is the extrusion thickness as illustrated in FIG. 2, and the leading end face 21 of the extruded column exhibits arcuate striation or swirls 22 that continue in like vein in the cross section along the bar, so that the end faces of the blanks 23 severed along lines 24 as is the conventional practice exhibit these swirls. The length dimension of the severed blank is indicated at Y, and its width X and thickness Z are those of the extrusion.

In conventional practice the severed blank 23 is turned 90° and laid on its side with shaved major faces 25 horizontal and dropped into a recess in a lower die part and pressed therein by a vertically directed force (FIG. 4) that is perpendicular to the extrusion grain. The resultant soap bar shown in FIG. 5 exhibits on the major faces linear color striations or streaks 20 as illustrated in major face 25. This is the soap currently marketed as "IRISH SPRING".

THE INVENTION

Referring now to FIG. 6, the soap column is extruded from the nozzle of a lower plodder barrel 31 wherein dye is injected as in Compa et al and wherein the nozzle forming plate 32 produces a rectangular cross section extrusion column 33 having the width dimension X and length dimension Y or the desired blank, and the column is severed on transverse lines 34 spaced the distance Z which is the thickness dimension of each blank 35 as shown in FIG. 10. FIGS. 7, 8 and 9 illustrate other modes of extruding one or more extrusion columns 33 of the required dimensions, that may be severed into blanks 35 as illustrated in FIG. 10. The plodders of FIGS. 6-9 need not have the shaving devices illustrated in FIG. 1A for reasons to appear.

The end face 36 of column 33 (FIG. 10) exhibits color swirls 37 as on face 21 in FIG. 2. Each blank 35 is turned 90° to the FIG. 11 position and placed in the lower die part as shown in FIG. 12 and pressed by application of a vertically directed force that is in the direction of the extrusion grain.

The finished soap bar 38 is shown in FIG. 13 ready for packaging. It exhibits on each major face 39 an attractive and pleasing marbleized appearance with a unique "carrara" marble effect consisting essentially of generally parallel uniformly arranged curved swirls in the dye color, as distinguished from the linear design of FIG. 5, mainly enclosed within a perimeter having the base color.

FIGS. 14-21 illustrate controlled location injection of the color dye liquid into the base color soap of the pellets so as to provide attractive appearance and uniformity in the final product.

Referring to FIGS. 14-17 which illustrate mainly substantially a conventionally practiced mode of carrying out the teachings of said Compa et al patent, the illustrated double plodder is of the type disclosed in Compa U.S. Pat. No. 2,649,417 and Compa et al U.S. Pat. No. 3,485,905 and comprises a single bore upper barrel 101 having an inlet 102 through which milled soap of a desired base color is fed at a controlled rate onto a horizontal axis rotary worm 103 which homogenizes, compacts and feeds the soap to the right in FIG. 14 and forces it through a foraminous plate or screen 104 and a fixed compression plate 105, the latter having a series of relatively large diameter apertures 106. A knife 107 rotatable with worm 103 severs the filaments extruded through aperture 106 into a multiplicity of pellets 108 of desired size.

The lower barrel 109 contains a horizontal axis rotary worm 111 and has a top opening 112 at one end through which the pellets 108 drop in cascades onto worm 111. A vacuum hood 113 is secured over the end of the upper barrel 101 and over the opening 112 in the lower barrel to define a chamber 114 through which the pellets fall, and a source of vacuum is connected by conduit 115 to maintain chamber 114 and the interior of barrel 109 at a desired negative pressure.

The pellets falling on worm 111 are compacted and levigated and fed to the left in FIG. 14 where they are forced through a nozzle 116 the dimensions of which are arranged to extrude a continuous column of the rectangular cross section and extrusion grain shown in FIG. 10 as will appear.

The foregoing structure and mode of operation, except for the extrusion and pressing features, may be the same as disclosed in said Compa et al patents to which reference is made for further detail.

As pointed out the above-identified Compa et al patent discloses injecting dye of a different color than the soap of the pellets through a tube extending into the vacuum chamber where the dye falls with the pellets to the end of the worm below.

FIGS. 14-17 disclose a first mode of dye injection currently practiced under the teaching of Compa et al wherein location of the open end or tip of the tube delivering dye through the vacuum chamber 114 provides striation in the extruded columns of FIGS. 6-9 and produces the marbleized soap bar product.

The dye injection tubing system 117 extends from a source 118 through air tight bushings 119 and 121 in the walls of the hood 113 to traverse the vacuum chamber 114 and terminates in a closed end 122. A vertical dye injection tube 123 which connects into tubing 117 at a coupling 124 extends down into the lower plodder chamber to terminate in a tip 125 that as shown in FIG. 14 is cut at a bias, preferably about 60° to the axis of worm 111, facing in the direction of movement of the soap by the worm.

As shown more clearly in FIG. 16, the tip 125 of the dye injection tube preferably terminates above and in substantially vertical alignment with the climb or upsweep side of the bottom worm, this being a preferred location longitudinally of the worm. In practice in 8 and 12 inch barrel plodders (worm flight diameters) the tip 125 is advantageously vertically about two inches to three inches above the worm.

The lateral location of tip 125 as shown in FIGS. 15 and 17 disposes tip 125 so that, with the worm 111 rotating counter clockwise as indicated by the arrow on it, liquid dye falling from the tip 125 in the vacuum chamber will tend to deposit at the worm periphery at about 1:30 o'clock in the diagram of FIG. 17. The preferred range is about 1:30 to 2:00 o'clock (about 45° from horizontal), and the dye enters a cascade of falling pellets prior to or at about the time the pellets fall onto the worm.

The foregoing location of the dye injection zone in FIGS. 14-17 has been found to be useful for producing final soap bars that have good color striation and with base soap color.

Referring now to FIGS. 18-21 which disclose a preferred mode of color introduction, the upper and lower barrel structure of the double barrel plodder are the same as in FIGS. 14-17 as indicated by the same reference numerals. In this embodiment however, the dye injection location is different. Here the dye supply tubing 117 enters the plodder through air tight bushings 119, 121 in the lower barrel wall rather than in the vacuum hood. A bracket 126 secured on the plodder wall extends down to fix the tubing 117 at the desired level, and a dye injecting tube 127 projects forwardly in the direction of soap movement in the lower barrel parallel to the worm axis into the throat 120 where the lower barrel is in transition from the upwardly open vacuum chamber to the cylindrical bore 130 which closely surrounds the worm. Tube 127 terminates in a downwardly open tip 128 that is longitudinally disposed well within the barrel throat as close as practically possible to bore 130 and well forwardly of the worm region onto which the cascade of pellets falls from the chamber 114.

As shown in FIG. 18 and diagrammatically indicated in FIG. 21 the tip 128 is laterally located with the plodder barrel to drip liquid coloring agent onto the soap being acted upon by worm 111 within the 30° arcuate range at about the 11:30 to 12:30 o'clock region indicated in FIG. 14, about 75° to 105° to the horizontal. The nozzle 116 has the dimensions of FIG. 6 whereby the extruded column corresponds in cross section to a major face of a bar as in FIG. 10 and the column is subdivided into blanks as in FIG. 10.

The foregoing location of the dye injection zone disclosed in FIGS. 18–21 has been found to be superior for producing a final soap bar tht has in the major faces clearly defined and distinctly spaced striation and swirls and optimum contrast with the base soap color, as compared with the location of FIGS. 14–17 which produces final soap bars wherein the striations and swirls on the major faces may be more closely spaced and might run together.

In each of the examples of FIGS. 14–17 and 18–21 the color dyed soap column is extruded as in FIG. 6, and the blanks severed as in FIG. 10 and pressed as in FIG. 12.

In the foregoing embodiments it is possible to produce multicolor swirls by injecting dyes of different color at longitudinally spaced points along the lower worm. Also it is possible to vary the width of the respective swirls by varying the rate of color injection and/or the pellet size arriving at the bottom worm.

In addition to the unique marbleized effect and increased rate of plodding due to use of higher moisture content base soap, the invention provides a less expensive and more simple plodding operation in that the need for surface shaving and recycling the shaved ribbons is eliminated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method for producing a soap bar having a marbled appearance on a major face and a length and width dimension defining said major face and a thickness dimension less than either of said length and width dimensions, comprising the steps of supplying a base soap component to the vacuum chamber of a soap plodder, adding a secondary component having a color contrasting with the color of said base component to said vacuum chamber along with said base component, said base soap descending from above onto and being worked by a generally horizontal rotating worm in the plodder and said secondary component being a liquid dye discharged from above to be introduced into the base component being worked by the worm, working said base component and secondary component longitudinally through said soap plodder by rotation of said worm to form a soap mass while mixing said mass so as to provide a marbled pattern across the transverse cross section prior to extrusion, extruding said mass through an extrusion die to form a billet, said extrusion die having an extrusion opening of a size and shape corresponding to the major face of said soap bar thereby imparting an extrusion grain to said billet generally perpendicular to said major face, cutting said extruded billet into blanks at an interval less than the length and width dimensions of said major face whereby to provide opposed sooth major faces having distinct color patterns without shaving the surfaces of said major faces, and pressing the opposed major faces of said blanks, said pressing forces being directed in a generally parallel direction to said extrusion grain.

2. The method defined in claim 1, wherein said liquid dye is discharged from a source opening that is located a predetermined distance transversely of a vertical plane passing through the worm axis and above the climb side of a worm flight in said plodder.

3. The method defined in claim 2, wherein said dye discharges toward the worm periphery to deposit within an angular zone of predetermined extent with respect to the worm axis that extends from about 30° with respect to a horizontal plane containing the worm axis to an angle of less than 90° to that plane.

4. The method defined in claim 3, wherein said zone is disposed between 30°–45° with respect to said plane.

5. The method defined in claim 1, wherein the forward end of said worm extends through a closely surrounding barrel bore that terminates in an extrusion nozzle and said liquid dye is deposited upon the soap being worked by the worm substantially at the end of said bore opposite the extrusion nozzle.

6. A method of producing a soap bar having a marbled appearance according to claim 1, wherein said extrusion opening is rectangular with the sides corresponding to the length and width of the final bar and said billet is smoothly severed into blanks at distances corresponding to the thickness of the final bar so that color striations extending in the direction of the extrusion appear as a pattern on the smooth cut major faces of the blank.

* * * * *